US006431847B1

(12) United States Patent
Hawley et al.

(10) Patent No.: US 6,431,847 B1
(45) Date of Patent: Aug. 13, 2002

(54) APPARATUS FOR COMPOUNDING RESIN AND FIBER

(75) Inventors: Ronald C. Hawley, Winona; Paul C. Cross, Shorewood; Craig N. Hansen, Eden Prairie, all of MN (US)

(73) Assignee: Woodshed Technologies, Inc., Winona, MN (US)

( * ) Notice: Subject to any disclaimer, the term of this patent is extended or adjusted under 35 U.S.C. 154(b) by 0 days.

(21) Appl. No.: 09/491,925

(22) Filed: Jan. 27, 2000

Related U.S. Application Data (63) Continuation-in-part of application No. 09/286,778, filed on Apr. 6, 1999, now Pat. No. 6,186,769.

(51) Int. Cl.⁷ .............................................. B29B 15/10
(52) U.S. Cl. ...................................... 425/113; 118/420
(58) Field of Search ................................ 118/405, 420; 264/136; 366/76.3, 76.4, 76.5; 425/113, 202, 205, 258, 289, 585, 586, 587; 427/434.7

(56) References Cited

U.S. PATENT DOCUMENTS

| 3,042,570 A | * | 7/1962 | Bradt ........................ 156/180 |
| 3,520,027 A | * | 7/1970 | Amos et al. | |
| 3,752,614 A | * | 8/1973 | Bremer ...................... 425/113 |
| 3,804,570 A | | 4/1974 | Hoschele et al. | |
| 4,616,989 A | | 10/1986 | Mewes et al. | |
| RE32,772 E | | 10/1988 | Hawley | |
| 4,806,298 A | * | 2/1989 | Wilkinson et al. ........... 118/405 |
| 5,110,275 A | * | 5/1992 | Scheuring ................... 425/113 |
| 5,165,941 A | * | 11/1992 | Hawley ...................... 425/205 |
| 5,185,117 A | | 2/1993 | Hawley | |
| 5,571,326 A | * | 11/1996 | Boissonnat et al. .......... 118/405 |
| 5,653,534 A | * | 8/1997 | Matsumoto et al. ........ 366/76.3 |
| 5,843,231 A | * | 12/1998 | Spencer et al. ............. 118/420 |

FOREIGN PATENT DOCUMENTS

| CA | 1177614 A | * | 11/1984 | ................. 118/420 |
| DE | 4016784 A1 | | 11/1991 | |
| EP | 0432427 A1 | | 6/1991 | |
| EP | 0694378 A2 | | 1/1996 | |
| GB | 1151964 | | 5/1969 | |
| JP | 61-40850 A | * | 2/1986 | ................. 118/405 |
| JP | 63-147622 A | * | 6/1988 | ................. 118/420 |
| WO | WO 86/00568 A1 | | 1/1986 | |

* cited by examiner

Primary Examiner—Robert Davis
(74) Attorney, Agent, or Firm—Moore & Hansen

(57) ABSTRACT

Molding material consisting of resin coated reinforcing fiber strands in a molten mass of resin is prepared at a molding site for controlled supply to a molding machine. Continuous strands of fiber from supply spools are entrained with pressurized, molten resin flowing through a coating device and coated with the resin. The movement of the fiber and resin through the coating die may be controlled so as to accurately and predictably produce any desired quantity the molding material, i.e. the coating apparatus may be operated in a discontinuous manner to provide any predetermined quantity of molding material to a receiving device. The receiving device may be the feed screw for an injection molding machine or simply a plate movable to and from a compression molding machine. The fiber strands may be cut into predetermined lengths by a cutting device positioned downstream of the aforesaid coating device.

36 Claims, 5 Drawing Sheets

APPARATUS FOR COMPOUNDING RESIN AND FIBER

PRIORITY CLAIM

The present application is a continuation in part of U.S. patent application Ser. No. 09/286,778 filed on Apr. 6, 1999 and now issued as U.S. Pat. No. 6,186,769.

FIELD OF USE

This invention relates generally to the field of mixing or compounding reinforcing fiber strands with thermoplastic resin.

The fiber strands may be of any predetermined length and are introduced into an admixture with thermoplastic resins for immediate use in molding machines at a product molding facility.

BACKGROUND OF THE INVENTION

Processes are known for combining reinforcing fiber strands with thermoplastic resin to form reinforced plastic composites. U.S. Pat. Nos. 4,439,387 and Re. 32,772 sharing common inventorship herewith disclose the embedding of thermoplastic resin in reinforcing fiber strands as they are drawn through a forming die having a convoluted passage, in the presence of molten thermoplastic resin introduced from an extruder. The extrusion product of that process comprises an elongated bar or rod having a continuous length of reinforcing fiber encased within thermoplastic resin. That preformed composite may be inserted into a die of an injection molding machine, and utilized as an insert in a compound, composite product comprising an additional layer of thermoplastic resin molded over the insert. It is also known to cut the extrudate rod from the aforesaid forming die into short lengths for use as molding pellets. In the process of the aforesaid United States patents, the extruded rod comprising a fiber/resin composite is immediately cooled, prior to final forming and cutting to desired lengths.

U.S. Pat. No. 5,185,117, also having identity of inventorship herewith, discloses a process for compounding thermoplastic resin and fiber strands in an extruding compounder. According to the process of that patent, melted thermoplastic resin is introduced into the compounding extruder along with reinforcing fiber strands. The resulting extrudate consists of a molten mass of thermoplastic resin having discrete lengths of fiber strands randomly dispersed therein. This hot mixture may then be fed directly into a preform device to produce a measured preform for use in a compression molding machine. In the disclosed process of the '117 patent, the fiber strands are precut to desired lengths, before being introduced into the extruding compounder. The process and apparatus further requires a loss-in-weight scale to accurately measure predetermined quantities by weight of reinforcing fiber strands to be controllably introduced into the compounding extruder in the presence of thermoplastic resin. A separate loss-in-weight feed scale assembly is required to accurately convey predetermined amounts by weight of the thermoplastic resin into the compounding extruder for mixing in the desired proportions with the reinforcing fiber strands. The loss-in-weight scales necessarily add to the cost and complexity of the compounding apparatus.

U.S. Pat. No. 4,616,989 discloses an apparatus for incorporating glass fiber strands into thermoplastic resins in which a premixing chamber is utilized to initially mix glass fiber strands with molten resin. This mixture is then fed into a two-stage screw-type extruder to complete the mixing of the fiber strands and resin. The resin-fiber mass as discharged from the final extruder is passed through a forming die having a plurality of orifices. This serves to form the material into elongated filaments of glass fiber reinforced resin which are then cooled, and then granulated for use as a molding compound.

U.S. Pat. No. 2,877,501 to Brandt discloses a process for forming granules comprised of glass fiber strands coated with a molding plastic, which are intended for use as feed stock for an injection molding machine. In the Brandt process, fiber strands are pulled through an orifice within which they are coated with a resin material.

None of the known prior art processes for formulating a mixture of fiber reinforced resin for molding purposes are operatively effective for preparing a molding material comprised of fiber reinforced resin for immediate introduction into a molding machine at the same site where the fiber-resin mixture is made. Nor can any of the known prior art processes for formulating a mixture of fiber reinforced resin for molding purposes operate in a controlled and accurate discontinuous manner. Either cumbersome and costly apparatus, including multiple stage mixing devices and loss-in-weight scales, are required in the prior processes, and/or the fiber-reinforced resin is extruded into lengths, cut and packaged for sale and transportation to separate molding facilities.

There thus exists a need for a compact, efficient apparatus and process for accurately formulating mixtures of fiber and resin and thereafter directly introducing that molding material directly into a molding machine, such as an injection molding machine, a compression molding press, a transfer mold, a blow mold, a profile extrusion machine or an inject compression molding machine. In addition, there also exists a need for an apparatus and process capable of operating in a discontinuous manner to allow the admixture of variously sized batches of fiber reinforced resin molding material.

SUMMARY OF THE INVENTION

This invention has as its primary objective the provision of a process and apparatus for interspersing fiber strands in a thermoplastic resin in a desired weight ratio, under a controlled, fiber-coating process, and thereafter introducing the coated fiber strands directly into a molding machine at the same site, without cooling of the fiber-resin mixture. Another objective lies in the provision of a process and apparatus as described which may be operated in a discontinuous manner so as to produce discrete and varying amounts of the fiber-resin mixture.

These basic objectives are realized by threading at least one fiber strand through a coating die passage having an outlet and introducing into that passage a thermoplastic resin in a molten, pressurized state so that the thermoplastic resin flows from the passage through the outlet, thereby entraining the fiber strand in the flow of thermoplastic resin and coating the fiber strand with thermoplastic resin.

The coating die passage comprises at least one orifice of predetermined size that is larger in cross-sectional area than the cross-sectional area of the fiber strand. The remaining annular space between the fiber strand and the orifice through which molten resin passes defines a predetermined area through which the thermoplastic resin may flow. The ratio of the cross-sectional area of the fiber to the cross-sectional area of the annular space being the means whereby the proportion of resin coating to fiber strand may be controlled.

The process for interspersing fiber strands in a thermoplastic resin comprises the steps of conveying at least one fiber strand through a coating die in the presence of molten thermoplastic resin, thereby coating the fiber strand with the resin; and thereafter directly introducing the resin-coated fiber strand in a heated state into a receiver for movement into a molding machine. The receiver may comprise an extruder barrel which houses a rotatable screw or simply a plate or tray utilized to convey a pliant mass of resin and fiber into the mold press of a compression molding machine.

This process may be run in a discontinuous manner to produce a desired quantity of the molding material. The thermoplastic resin is typically introduced into the passage at pressures of between 4,000 psi and 40,000 psi. By way of example, a coating die operating at pressures between 12,000 and 14,000 psi resulted in the resin coated fiber strand becoming entrained with the resin flowing through the coating die at velocities of between 80 and 250 feet per minute. The resulting fiber-resin mixture comprises between 20 to 60 weight percent fiber strands.

The apparatus for wetting and conveying fiber strands with a thermoplastic resin of the present invention comprises a housing having a passage with a fiber inlet and an outlet. This passage is arranged and constructed to permit a continuous strand of said fiber to be passed from the inlet through the housing and out of the outlet. A resin injection port is fluidically connected to the passage to direct the thermoplastic resin into the passage under pressure. The pressurized flow of the thermoplastic resin into the passage contacts the continuous strand of fiber disposed through the passage and causes the continuous strand of fiber to be drawn through the housing. As the continuous strand of fiber is drawn through the housing, it is wetted by the thermoplastic resin.

The apparatus for coating fiber strands with a thermoplastic resin preferably comprises a resin-receiving chamber that is in fluidic communication with the resin injection port. In addition, the inlet to the passage through the housing may comprise a nozzle that extends into the passage. And, in order to prevent the backflow of resin into this nozzle, it may be desirable to form at least one back flow passage fluidically that is connected to the inlet to the passage of the housing.

In order to precisely adjust the fiber to resin ratio of the fiber reinforced resin molding material, a traction block having a bore formed therethrough may be connected directly to the coating die. The bore of the traction block is fluidically connected to the outlet of the passage through the housing of the coating die so as to allow the continuous strand of fiber and thermoplastic resin to pass therethrough. The diameter of the bore may be sized to pass therethrough the continuous strand of fiber and the thermoplastic resin in a predetermined weight ratio.

In order to optimize the flow of resin and fiber through the apparatus of the present invention, the geometry of the coating die may be arranged in a number of ways. For example, the passage and the injection port may be arranged such that their axes of symmetry intersect perpendicularly or at an acute angle. In addition, it may be desirable for the axis of symmetry of the injection port to intersect an annular chamber of the passage tangentially.

In an other embodiment of the present invention the apparatus for coating and conveying fiber strands with a thermoplastic resin comprises a housing having a fiber inlet and outlet with a fiber entrainment and resin coating passage within the housing connected between the fiber inlet and outlet for the passage of a continuous strand of fiber through the housing. A resin injection port in the housing is in fluid flow communication with the fiber entrainment passage to introduce pressurized resin in a fluid state into contact with the continues strand of fiber in the entrainment passage. A supply of continuous fiber strand is connected to the fiber inlet of the housing and a supply source of molten thermoplastic resin is placed in fluidic communication with the resin injection port in the housing. The pressurized flow of resin into the entrainment passage conveys the continuous strand of fiber through the housing and out of the fiber outlet while coating the fiber with the resin. The resin injection port may be arranged to open upon a resin receiving chamber within the housing having at least one flow passage extending from the resin receiving chamber to the fiber entrainment passage. The resin receiving chamber and the flow passage place the resin injection port in fluidic communication with the fiber entrainment passage. The flow passage extends in the general direction of extent of the fiber entrainment passage and thereby directs pressurized resin in the same general direction as that of fiber movement within the fiber entrainment passage, enhancing the movement of the fiber strand towards the fiber outlet.

A receiving device is constructed and arranged to receive the resin coated fiber from the outlet of the housing and deliver the resin coated fiber to a molding machine or the like positioned in close proximity thereto.

A fiber inlet nozzle having an outlet orifice that is in fluid flow communication with the fiber entrainment passage may be positioned within the fiber inlet in the housing. The outlet orifice of the nozzle is of a predetermined size to allow a fiber strand of predetermined diameter to pass therethrough while substantially preventing the backflow of pressurized resin from the fiber entrainment passage through the fiber inlet nozzle. In one embodiment, the nozzle has a tapered outlet end constructed and arranged to define at least one flow passage in fluid flow communication between the resin injection port and the fiber entrainment passage. More specifically, the at least one flow passage is defined between the tapered outlet of the nozzle and an adjacent wall of the housing. Alternatively, the nozzle may have a resin receiving chamber formed therein from which the at least one flow passage extends to the fiber entrainment passage, the chamber being in fluidic communication with the resin injection port within the housing. The at least one flow passage typically has its discharge end opening into the fiber entrainment passage in close proximity to the outlet orifice of the nozzle. In order to promote more laminar flow of the resin, the resin receiving chamber is preferably of an annular shape.

One or more back flow chambers may be located upstream from where the injection port communicates with the passage to prevent resin from escaping the coating die through the passage or nozzle.

These and other objectives and advantages of the invention will appear more fully from the following description, made in conjunction with the accompanying drawings wherein like reference characters refer to the same or similar parts throughout the several views.

DESCRIPTION OF THE DRAWINGS

FIG. 9 is a vertical section of a one embodiment of the apparatus of this invention comprising a solid housing;

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figures 1, 4:
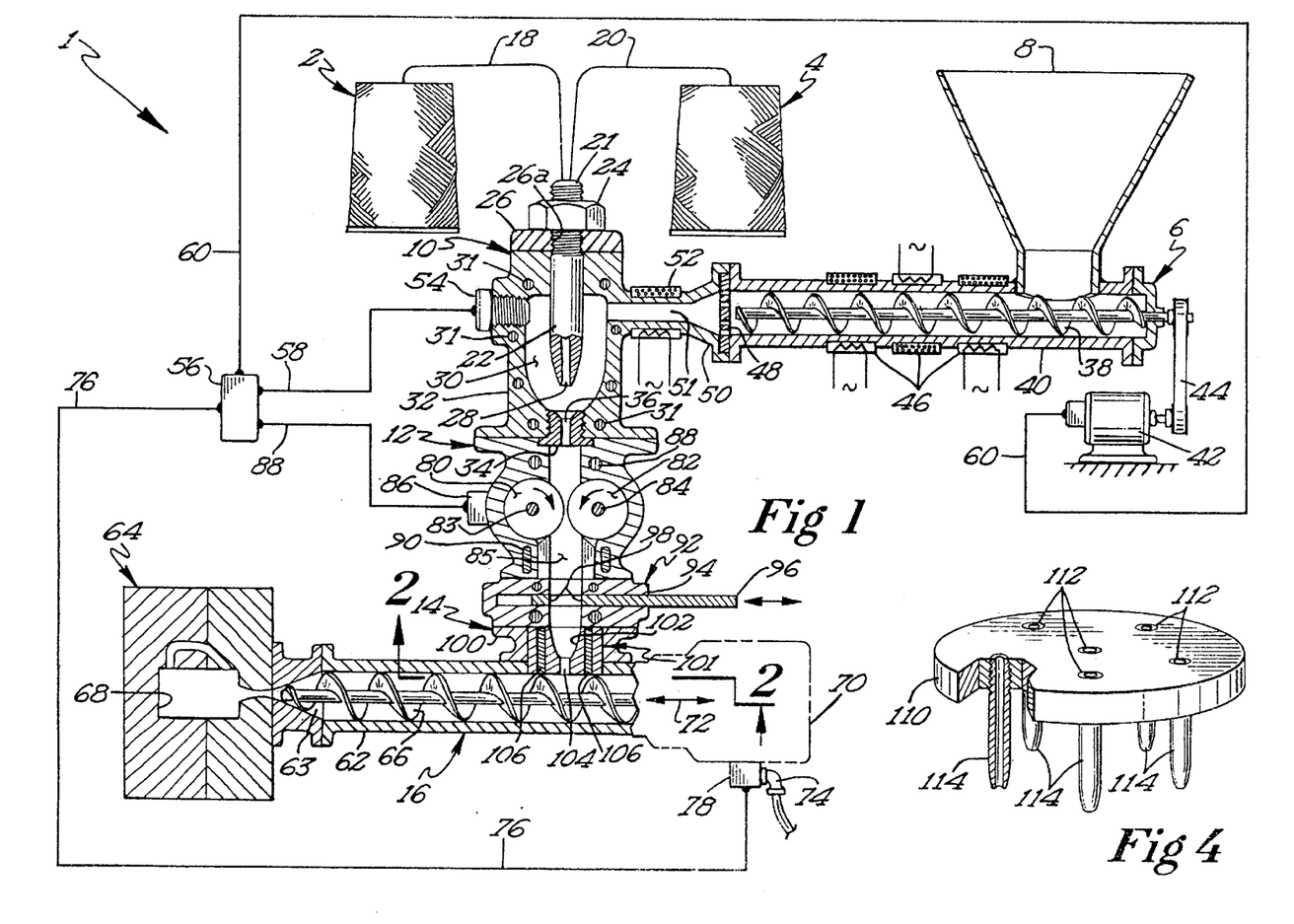
FIG. 1 is a showing in vertical section of the apparatus and process of this invention with respect to one embodiment.
FIG. 4 is a perspective view of an orifice plate assembly, which may be utilized to feed multiple strands of fiber into a coating chamber.

Referring now to the drawings, there is shown in FIG. 1 an embodiment illustrating the apparatus and process of this invention for preparing fiber reinforced resin as a molding charge. The apparatus or system is comprised of spools or rolls of fiber 2, 4, a resin supply extruder 6 having a feed hopper 8, a coating die 10, a fiber and resin conveying device 12, a transition nozzle assembly 14, and a receiving device generally indicated by reference numeral 16. Reinforcing fiber strands, such as glass fiber, is supplied from spools or supply rolls 2 and 4 in the form of strands 18 and 20. Each of the strands 18 and 20 actually comprises a bundle of very fine fiber filaments, with as many as several thousand filaments per bundle. These fine filaments have diameters which may range from 10 to 25 microns, by way of example. The fiber strands or bundles may comprise, among others, glass fiber strands and carbon-graphite fiber or Kevlar® fiber strands. The use of two supply fiber strands 18 and 20 facilitates splicing the ends of those fiber strands together, in the event that one of the fiber spools 2 or 4 should become exhausted. The fiber strands 18 and 20 are directed into a single guide nozzle 22 having a threaded end 21 secured in place by a nut 24 on top of coating die 10. An orifice plate 26 is mounted on top of coating die 10, and is provided with an orifice 26a through which guide nozzle 22 extends. As is hereinafter set forth, orifice plate 26 may have any number of orifices or ports to receive multiple nozzles 22, and thus to guide multiple strands of fiber 18, 20 into coating die 10. Nozzle 22 has a passage 28 extending therethrough for passage of the fiber into chamber 30 formed within housing 32 of coating die 10.

Housing 32 of coating chamber 10 is provided at its outlet side with an outlet orifice plate 34 having an orifice 36 of predetermined size. As is hereinafter set forth, orifice 36 has a predetermined diameter that will accommodate the fiber strand and a coating of thermoplastic resin thereon.

Thermoplastic resin, preferably in the form of pellets, is provided to resin supply extruder 6 from a feed hopper 8. The resin may be any of a variety of acceptable thermoplastic resins for the product purpose intended, such as polypropylene, nylon, polyurethane, and polyesters. A feed screw 38 is rotatably mounted within housing or barrel 40 of extruder 6, for rotational driving movement by motor 42. Any conventional drive arrangement, such as the belt 44, may be utilized for transmitting driving power from motor 42 to extruder screw 38. A plurality of electric heaters 46 may be utilized in a conventional manner to heat the resin being propelled through extruder barrel 40. The terms "thermoplastic resin" and "resin" as used herein shall have broader meanings than that normally ascribed to the terms. As used herein, the terms "thermoplastic resin" and "resin" shall be understood to include any resins, polymers, or monomers that are suitable for use in a fiber coating apparatus and method according to the present invention. In addition, the terms "thermoplastic resin" and "resin" shall also be deemed to include any thermoset material that may be suitable for use in a fiber coating apparatus and method according to the present invention. It is also to be understood that the present invention may be useful as a conveying device for fibers and fiber strands. In a conveying device, liquids such as water may be used for the entrainment of the fiber strands.

An orifice or breaker plate 48 is also preferably utilized at the output end of extruder barrel 40. That plate is provided with a plurality of orifices to control the flow of molten thermoplastic resin from extruder barrel 40 into an adapter connector 50 having an internal flow passage 51. An additional electric heater 52 may be provided on adapter 50 to maintain the resin in a molten state at a predetermined temperature as it enters chamber 30 of coating die 10.

Additional electric heating elements 31 are also provided as necessary in the housing 32 of coating die 10 to insure that the molten resin stays heated at a predetermined temperature as it coats fiber strands 18, 20 being conveyed through guide nozzle 22 in chamber 30.

A pressure transducer 54 is preferably threadedly inserted into housing 32 of coating die 10 to sense the pressure therein. A microprocessor type of controller 56 is incorporated in a control system for operational control of various components of the system as hereinafter set forth. Lead 58 from pressure sensor 54 is connected to microprocessor 56, with lead 60 being connected therefrom to drive motor 42 for resin supply extruder 6.

Coupled to the output side of coating die 10 is a conveyor device 12 which is preferably utilized for pulling the fiber strands 18, 20 through coating chamber 30 of coating die 10 and ultimately pushing the mass of fiber and thermoplastic resin into a receptacle or receiving device 16. As shown in FIG. 1, the receiving device 16 may advantageously comprise the barrel 62 of the feed extruder to an injection molding machine 64. A feed screw 66 is rotatably and reciprocally mounted within barrel 62 for feeding charges of resin and fiber molding material into the molding cavity 68 of injection molding machine 64. The feed screw 66 is driven by a standard power unit generally indicated by reference numeral 70 of known design for imparting rotational motion, as well as reciprocal linear movement to screw 66. The arrow 72 indicates the reciprocal path of molding material feed screw 66. Power is supplied to drive unit 70 at a connection 74; and a control lead 76 is connected from an electrical current sensor 78 on the power line to power unit 70 to microprocessor control 56. Current sensor 78 may be of a known design of the induction type.

Various types of conveying devices or mechanisms may be utilized for conveying device 12. In the embodiment shown on FIG. 1, the conveying device comprises a pair of rotatably mounted and driven pinch rollers 80, 82 which rotate toward each other as indicated by the directional arrows. Those rollers are mounted on shafts as shown, and driven by a motor and transmission mechanism of any suitable type. For example, a drive motor may be connected to one of the pinch roller shafts 83, with the other shaft 84 being driven by a chain or belt transmission device. The drive motor for the pinch rollers 80, 82 is controlled through a power supply 86, having a control lead 88 which is also connected to microprocessor 56.

In order to insure that the mixture of resin and fiber strands is maintained at the desired high temperature level during the coating within chamber 30, as well as during the conveying through device 12 and into the receiver 16, multiple heating elements are utilized. Additional heating elements 31 are provided within the housing of coating device 10; and heating elements or cartridges 89 and 90 are provided within the housing of conveying device 12.

In the preferred embodiment, the coated fiber being discharged from conveying device 12 is cut into discontinuous, predetermined lengths. This may be done in several ways. It is contemplated that coated fiber strands discharging from conveying device 12 may be pushed directly into barrel 62 of the feed screw 66 for injection molding machine 64. The rotational action of screw 16 in the close tolerance fit with the inside surface of barrel 62 will cut the fiber into lengths. It is also contemplated that the coated fiber strands may be fed into a compounding extruder of the type disclosed and identified by reference numeral 8 in U.S. Pat. No. 5,185,117. Whether the receiving extruder is the feed screw for an injection molding machine, or a compounding extruder as disclosed in U.S. Pat. No. 5,185,117, the final dispersement, impregnating and wetting of the fiber strands by the resin takes place within the barrel of the extruder.

Alternatively, and in a preferable mode, the coated fiber strands discharging from conveying device 12 are cut into predetermined lengths by a cutting device 92 positioned downstream of the discharge port 85 for conveying device 12. For that purpose, cutting device 92 comprises housing 94 apertured as shown to receive coated fiber from discharge port 85. Housing 92 is slotted to slidably receive a cutting blade 96. Blade 96 is connected to a suitable power source (not shown) of known design for imparting reciprocal linear motion to it. The directional arrow on blade 96 indicates such reciprocal movement. Blade 96 has an inner aperture defined as shown by cutting edges 98. It will thus be seen that as blade 96 reciprocates laterally, with the fiber material discharging from conveying device 12 through port 85 passing through the blade aperture, the cutting edges 98 will alternately and intermittently cut the fiber. The speed of blade 96 is controlled so as to provide fiber of predetermined lengths.

Downstream of cutting knife assembly 92, a transition nozzle assembly 14 is provided for the controlled feeding of a hot molten mixture of resin and fiber strands into receiver 16. As described above, with respect to FIG. 1, that receiver comprises the barrel 62 of an in-feed extruder for injection molding machine 64. The nozzle assembly is comprised of an apertured housing 100 that serves as a transition piece between knife housing 94 and extruder barrel 62. Contained within housing 100 is a nozzle 101 having a flow passage 102 to receive coated and cut fiber strands discharging from cutting knife housing 94. Flow passage 102 preferably is contoured to a tapered shape as shown to provide flow communication with a discharge orifice 104 of predetermined size. Orifice 104 provides a flow restriction to the passage of the mass of coated fiber strands being pushed out of discharge port 85 of conveying device 12. The mass of coated fiber strands is forced through orifice 104 into the barrel 62 of receiver 16.

In operation, fiber strands comprising bundles of filaments 18 and 20 are pulled from supply spools 2 and 4 into guide nozzle 22 of coating chamber 30 of the coating die 10. Molten, fluid thermoplastic resin is forced by extruder feed screw 38 through orifice plate 48 into adapter connector 50, from which the molten resin flows into chamber 30 of coating die housing 32. The controlled operation of heaters 46 and 52 insures that the thermoplastic resin is maintained at a desired high temperature in a fluid state.

The moving bundle of glass fiber strands exiting from the tip of fiber passage 28 within nozzle 22 will collect some of the thermoplastic resin, which will adhere to the fiber strands and move with the fiber bundle, downwardly through mixing chamber 30. This coated fiber bundle will be pulled through outlet orifice 36 of orifice plate 34 by the conveying device 12. As described above, the conveying device of the embodiment of FIG. 1 comprises a pair of rollers 80, 82, closely spaced so as to define a nip therebetween. The fiber bundle, coated with thermoplastic resin, is engaged by that nip, between the rollers and pulled through the housing of conveying device 12.

As the bundle of fiber strands and resin is pulled through outlet orifice 36 of the mixing chamber 30, excess resin is scraped off on the side walls of orifice 36. That orifice is of a predetermined size so as to control the resin content and ratio of resin to fiber to that required for the end product being molded. The fiber-resin ratio is expected to be in the range commonly used for reinforced thermoplastics, such as 10 percent to 60 percent glass fiber content by weight.

The pressure sensing transducer 54 located within chamber 30 of the coating die 10 regulates the speed of rotation of resin feed screw 38. This insures that the resin is fed at the desired rate compatible with the movement of fiber strands through guide nozzle 22, by conveying device 12. The desired predetermined weight ratio of fiber and resin is thus achieved. The multiple heating elements 31 in the walls 32 of coating die 10 are further regulated to maintain the desired high temperature within chamber 30 during the fiber coating process. Pressure transducer 54 may also be used to start and stop resin feed screw 38 as required for the batch feeding process of injection molder 64. Sufficient pressure is maintained within chamber 30 so as to maintain good intimate contact of resin with the fiber strands 18, 20. Excessive pressure is to be avoided in order to keep the molten resin from flowing out of orifice 36 in an uncontrolled manner.

It is to be noted that guide nozzle 22 is oriented so as to be in direct alignment with outlet orifice 36. This insures that the fiber strands will move smoothly, without interruption, through coating die 10, and into the housing of conveying device 12.

As noted above, each of the fiber strands 18 and 20 is comprised of multiple fine fiber filaments. Within chamber 30, the molten thermoplastic resin coats the outside of the fiber strand and encapsulates some of the fiber filaments on the exterior of the fiber strand.

It is to be noted that orifice plates 26 and 34 having multiple orifices can be utilized for the purpose of introducing any number of fiber strands, simultaneously, into coating die 10. FIG. 4 illustrates such an orifice plate 110 having multiple orifices 112. Such a plate 110 may be substituted for the single orifice plate 26 on the input side of housing 32 of coating die 10. Each of the orifices has threadedly inserted therein a fiber guide nozzle 114. In the embodiment shown, six such guide nozzles 114 are utilized for the six receiving orifices 112. It is to be understood that a matching orifice plate having six such outlet orifices must be substituted for orifice plate 94 at the output or discharge side of coating die chamber 30. The apertures in the outlet orifice plate will necessarily be oriented to be in exact alignment with the plurality of guide nozzles 114 so that the coated fiber strands will flow directly and smoothly from guide nozzles 114 into and through the outlet orifices at the bottom or output side of housing 32 of coating die 10.

The action of pinch rollers 80, 82 pushes the mass of resin coated fiber strands through apertured cutting knife plate 96. As noted above, that plate reciprocates at a predetermined speed so as to cut off the coated fiber strands in predetermined lengths, as required for the particular physical properties of the product being molded. The slower the reciprocating speed of cutting knife 96, the longer will be the length of each fiber segment that is cut. Either short or long fiber strands may be provided, depending upon the molding application with which the fiber coating and feed apparatus is employed. Short fiber strands on the order of 0.030 inches to 0.050 inches may be utilized for certain applications, whereas long fiber strands of at least ¼ inch in length, and extending up to one inch and greater lengths may be provided as necessary and appropriate for the molding operation. It must also be understood that the cutter may be omitted entirely where a continuous, resin coated fiber is desired.

The action of pinch rollers 80, 82 pushes the molten mass of melted resin and chopped fiber, under pressure, into the receiving device 16. In the embodiment shown in FIG. 1, that mass of molten resin and fiber strands is pushed through flow passage 102 and discharge orifice 104 of nozzle 101 into the interior of extruder feed barrel 62. Orifice 104 causes a back pressure within passage 102 and at the discharge side of apertured cutting knife housing 94. As a result, the cut fiber strands are compressed into a molten mass with the hot resin in which they are encapsulated.

As noted above, feed screw 66 for injection molder 64 is both a rotating and reciprocating device. Such alternating power movement is imparted to screw 66 by drive unit 70. Feed screw 66 rotates in order to convey the resin/fiber mix forwardly into mold charge chamber 63 at the output side of extruder barrel 62. The screw then reciprocates rearwardly in order to build up that charge of molten material in chamber 63. When the mold 64 is closed, the feed screw 66 reciprocates forwardly to inject the molten thermoplastic resin and fiber charge into mold cavity 68.

During a portion of each molding cycle, the feed screw 66 is not rotating and is not accepting material through orifice 104. Accordingly, the operation of the conveying device 12, and in particular of the pinch rollers as shown in FIG. 1, must be stopped and started. Microprocessor 56 is utilized to coordinate the intermittent operation of conveyor device 12 and feed screw 66 in controlled synchronization. For this purpose, electric current sensor 78 provides signals through control lead 76 to microprocessor 56. The microprocessor in turn intermittently starts and stops the motor drive for conveying device 12 in synchronization with the starting and stopping of feed screw 66. This insures that a fiber and resin mix is supplied to receiver 16 only when screw 66 is in an operating mode to receive that material.

Figure 2:
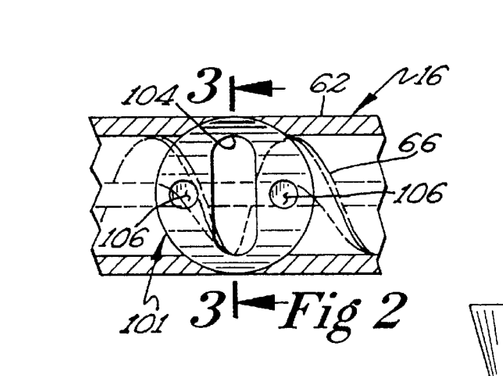
FIG. 2 is a horizontal section view of the transition nozzle at the output end of the apparatus, taken along lines 2—2 of FIG. 1.
Figure 3:
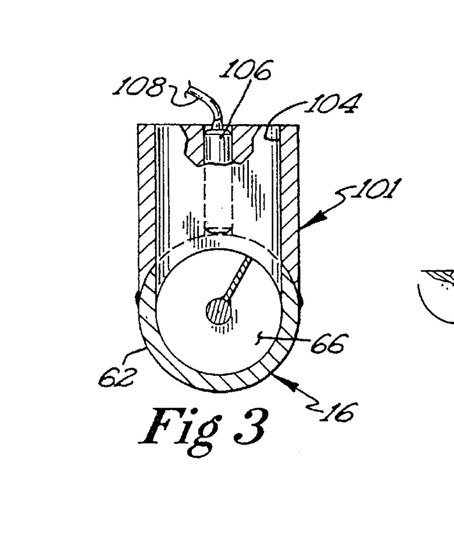
FIG. 3 is a vertical section view of the nozzle assembly of FIG. 2, taken along lines 3—3 thereof.

It is important to note that the resin on the fiber bundle exiting from coating die 10 is not allowed to cool to a solidified, hardened state, but instead is pulled through the coating die 10, coated with molten resin, cut and pushed into nozzle 101 in a heated state. This insures that the resin/fiber mix will be in the form of a mass of soft, pliant material to serve as a charge to be directly inputted to a molding machine. The cartridge heaters 106 having electric lead wires 108 as shown in FIGS. 2 and 3 serve to insure that the feed mix of fiber strands and resin does not unduly cool as it flows through nozzle 101 en route to the receiving device 16.

In that regard, it is to be noted that the mass of fiber and resin discharged through nozzle 101 by way of its orifice 104 may be received on a conveying mechanism for direct input into a compression molding machine, without further working by a feed screw of any kind. Such an operation is illustrated, partially schematically, in FIG. 5. The fiber and resin feed apparatus is generally indicated by reference numeral 1, and may be the same apparatus as indicated by reference numeral 1 in FIG. 1, and described above. Thus, the resin feed hopper 8 is shown in this side elevation view as being connected to the resin feed extruder housing 40. That feed extruder 40 is mechanically associated through adapter 50 with a fiber coating die 10, as described above. Fiber strands 18 and 20 may be provided from multiple spools or reels and initially drawn through a feed device 116. That device may utilize an apertured plate with ceramic eyelets to rack and orient the fiber strands, and to guide them without damage to a final positioning plate 118. Plate 118 has multiple ports to receive, locate and guide fiber strands in precise alignment with the multiple orifices or holes provided in the fiber inlet orifice plate as described above with respect to FIG. 4. A conveying device 12, such as the pinch rollers 80, 82 of FIG. 1, pulls the fiber strands through the coating chamber of coating die housing 10 and pushes them into and through discharge nozzle 101 of the type described above with respect to FIGS. 1, 2 and 3. Heating devices are used as described above in order to maintain the resin in a hot, molten state, and to provide a heated pliant mass of molding material 122 which is discharged from nozzle 101 onto a receiving and conveying plate 120.

Figure 5:
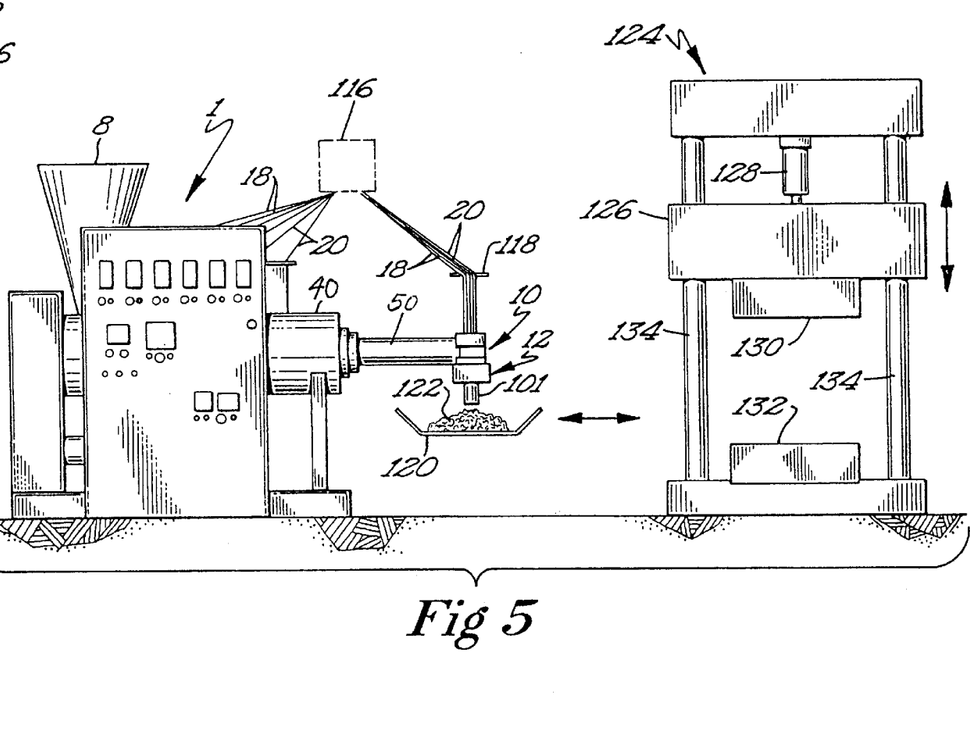
FIG. 5 is a schematic illustration of one embodiment of the apparatus of this invention as utilized in a system for making a molding mix of resin and fiber strands for direct utilization in a compression molding machine.

In this embodiment, the fiber strands may be discharged in continuous lengths, in a swirl pattern onto receiving plate 120. A gate and cutting device (not shown) may be utilized across the outlet end of nozzle 101 to intermittently cut off a mass of fiber and resin as it flows out of the discharge orifice at the bottom end of nozzle 101.

Receiving device 120 may be moved back and forth between nozzle 101 and a compression molding machine generally indicated by reference numeral 124. Molding machine 124 is of a conventional type incorporating a reciprocating platen 126. Power cylinder 128 serves to reciprocate platen 126 upwardly and downwardly on guide rods 134. An upper mold head 130 is carried on platen 126, and a mating, lower mold head 132 containing a material receiving mold cavity is mounted as shown at the base of the molding machine. The charge or mass of molding material 122 is deposited intermittently into the cavity of lower mold head 122 for molding a product of predetermined shape and physical properties. For parts requiring high impact resistance, the long continuous fiber strands contained within the fiber/resin charge 122 are particularly beneficial.

Figures 6, 7:
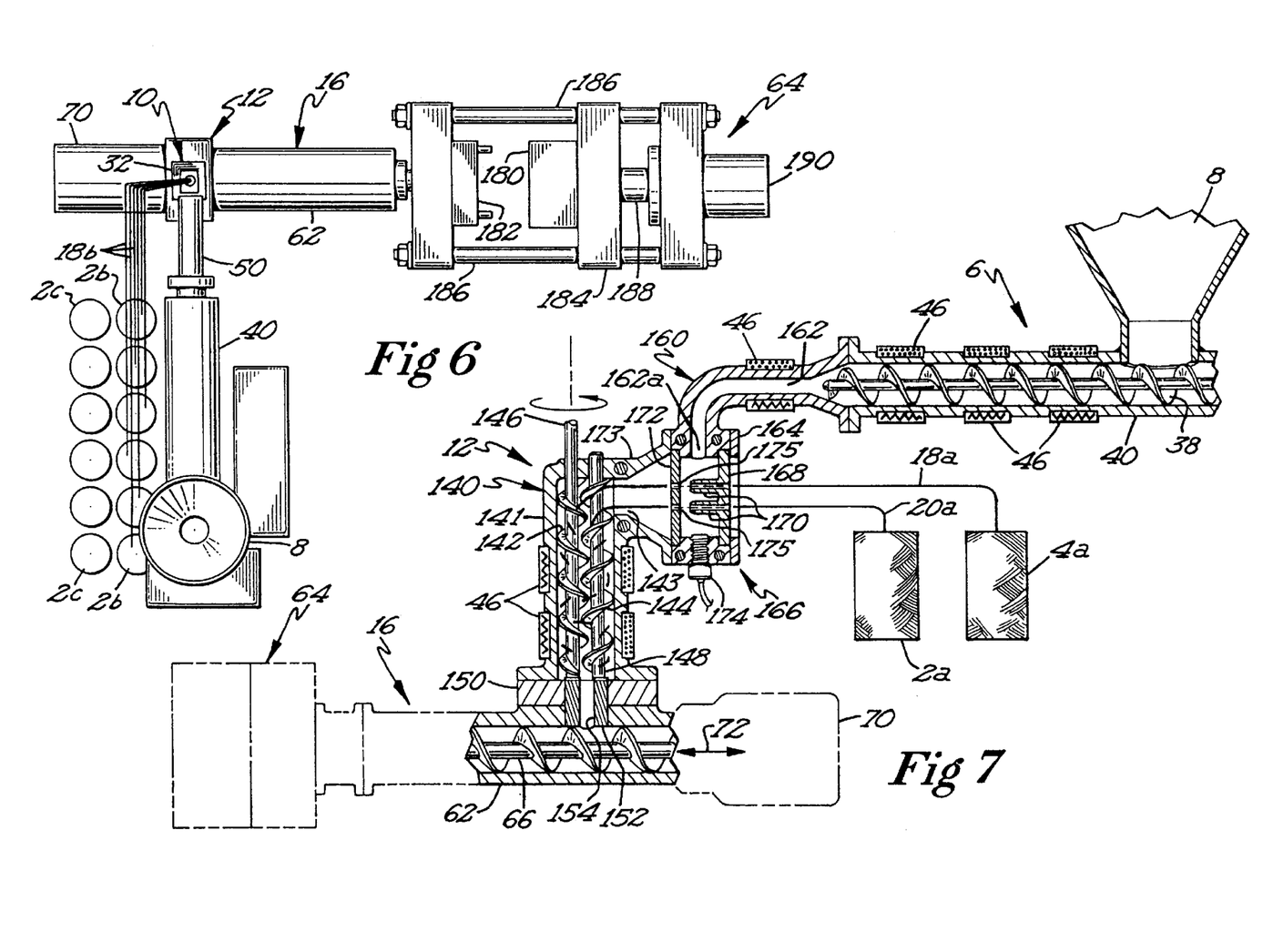
FIG. 6 is a top, plan view illustrating schematically the apparatus of FIG. 1 for use with an injection molding machine.
FIG. 7 is a vertical section view illustration of a modified version of the apparatus of FIG. 1 utilizing a screw type of conveying device for resin and fiber.

It is anticipated that the conveying device 12 as described above may take various forms of pumping devices. For example, a gear pump may be utilized in place of the nip rollers 80, 82. Alternatively, a pump of screw type construction may also be used. A conveying device of that construction is shown in FIG. 7, and is generally indicated by reference numeral 140. The screw pump or conveyor 140 has an outer housing 141 defining an inner chamber through which fiber strands are pulled after being coated by thermoplastic resin in coating die 166. The conveying device is further comprised of a pair of interacting screws 142, 144 mounted on drive shafts 146 and 148 respectively. Input rotary power may be supplied to screw shaft 146 from any type of power source. At the output side of screw pump 140, a transition plate 150 is provided to house a discharge nozzle 152 of predetermined size. Nozzle 152 has an internal flow passage 154 defining a discharge orifice at its outer end.

A resin supply extruder 6, as described above with respect to FIG. 1, may be utilized in the same way to supply molten thermoplastic resin to a coating die 166. Thus, feed screw 38 of the resin extruder is rotatably housed within a screw barrel 40 for power actuation by a drive source, not shown. The output end of extruder barrel 40 is connected to an adapter connector 160, which, for purposes of this embodiment, may have a right angle shape as shown to define an internal flow passage 162 disposed at a right angle to outlet flow passage 162a.

A fiber coating die generally indicated by reference numeral 166, and of the same general type as described above with respect to coating die 10 and its multiple orifice fiber feed plate 110 may be utilized as shown in FIG. 7. A cross-flow arrangement of thermoplastic resin with respect to fiber strands 18a and 20a is again utilized. Housing 164 of coating die 166 is shaped to contain a fiber input orifice plate 168. As shown, the input plate 168 has two orifices to receive the two fiber strands 18a and 20a from their supply spools 2a and 4a respectively. Fiber guide nozzles 170 of the same type and construction as described above with respect to nozzles 22 and 114 (FIG. 4) are mounted in the guide nozzle orifices to receive and guide the fiber strands through the coating chamber defined inside of die housing 164. An outlet orifice plate 172 is provided on the discharge side of coating die 166. As shown, that orifice plate has a pair of orifices 175 of predetermined size, which are positioned in exact alignment with guide nozzles 170 in order to receive the fiber strands being pulled through the coating die 166. A pressure sensor 174 may also be used as described above to control the speed and intermittent operation of resin delivery screw 38 in response to the predetermined resin pressure to be maintained within housing 164.

The interacting screws 142 and 144 grip the fiber strands and pull them into the conveying device 140 through its inlet opening 143. A transition segment 173 serves to guide the resin coated fiber strands into receiving opening 143 of pump housing 141. As the screws 142 and 144 rotate on their shafts 146 and 148, they grip the fiber strands and pull them through the coating die 166 into and through the housing 141. As the fiber strands 18a and 20a are pulled through the coating die 166, they are coated and embedded with molten thermoplastic resin in the manner described above with respect to FIG. 1. The interaction of the screws 142 and 144 is designed to initially pull the coated fiber strands into the screw pump chamber defined within housing 141, and then to convey the coated fiber coated strand(s) toward the discharge end of the screw pump defined by transition plate 150. During this pumping and conveying action of the twin screw conveyor, the fiber will be cut into discontinuous lengths by the screw blades 142 and 144. These chopped coated fiber segments are then conveyed to the nozzle 152 at the discharge side of the screw pump. The mass of fiber and resin material builds up pressure as it is pushed by the twin screws into and through the restriction provided by nozzle flow passage 154. The material thus becomes a mass of thermoplastic resin and chopped fiber, which is pushed under pressure into and through nozzle 152. Transition plate 150 and nozzle 152 are constructed and arranged as shown in FIG. 7 in the side wall of the barrel or housing 62 for mold feed screw 66, as shown in FIG. 7. The mass of pressurized fiber and resin is thus pushed by the pumping device 12, in the form of the twin screws, into the interior of extruder barrel 62. Thereafter, the rotating and reciprocating action of screw 66 forces the fiber and resin charge into mold cavity 68 of an injection molding machine 64 in the same manner as described above with respect to FIG. 1.

The driving operation of screws 142 and 144, as well as that of resin feed extruder screw 38, may be controlled by a microprocessor in synchronization with the operating action of mold charge feed screw 66 as described above with respect to microprocessor 56.

FIG. 6 illustrates in a top, plan view the combination of the fiber and resin feed and mixing apparatus as shown and described with respect to FIG. 1 with an injection molding machine 64. A plurality of spools or rolls 2b are shown as supplying strands of fiber 18b to the housing of a coating die 10. A reserve supply of fiber spools 2c is also illustrated. As spools 2b are exhausted, fiber strands are then supplied from the reserve spools 2c.

The coating die 10 may preferably utilize a multiple orifice guide plate 110 as shown and described with respect to FIG. 4. The multiple fiber strands 18b are directed into the orifices 112 of such a plate, and guided by nozzles 114 extending therethrough as shown and described with respect to FIGS. 1 and 4. The conveying device or resin/fiber pump is designated by reference numeral 12. As stated above, such a pump may comprise the pinch rollers 80, 82 of FIG. 1, the twin screw pump 140 of FIG. 7, a gear pump or other type of mechanism for imparting movement to the fiber and resin. The barrel or housing 62 contains the mold material feed screw 66 as shown and illustrated with respect to FIGS. 1 and 7. By virtue of that in-feed device, the mix of hot resin and fiber is fed to the injection mold cavity defined by mold clamps or halves 180 and 182. A conventional injection molding machine is illustrated by reference numeral 64, and incorporates a platen 184 on which mold half 180 is mounted for sliding movement on guide rails 186. The piston 188 of a power cylinder 190 serves to provide the controlled opening and closing action of the mold halves 180 and 182 by reciprocating movement of mold half 180.

The utilization of a fiber and resin coating, conveying and mixing apparatus as described herein, in direct association with a molding machine as illustrated by way of example in FIGS. 5 and 6, at a molding site provides particular advantages of economy and molding operation. There is no need to receive and store preformed molding pellets of fiber reinforced resin at the molding machine site. Rather, the molding material comprised of fiber strands cut to a predetermined length and coated and encapsulated in thermoplastic resin is prepared at the site and fed to the molding machine as part of a continuous molding operation. Advantageously, the fiber strands may be supplied in the desired length and in the desired weight ratio to the resin in order to achieve the particular physical properties desired in the product being molded. Maximum flexibility of molding operations for different applications is thus achieved.

Figures 8, 10:
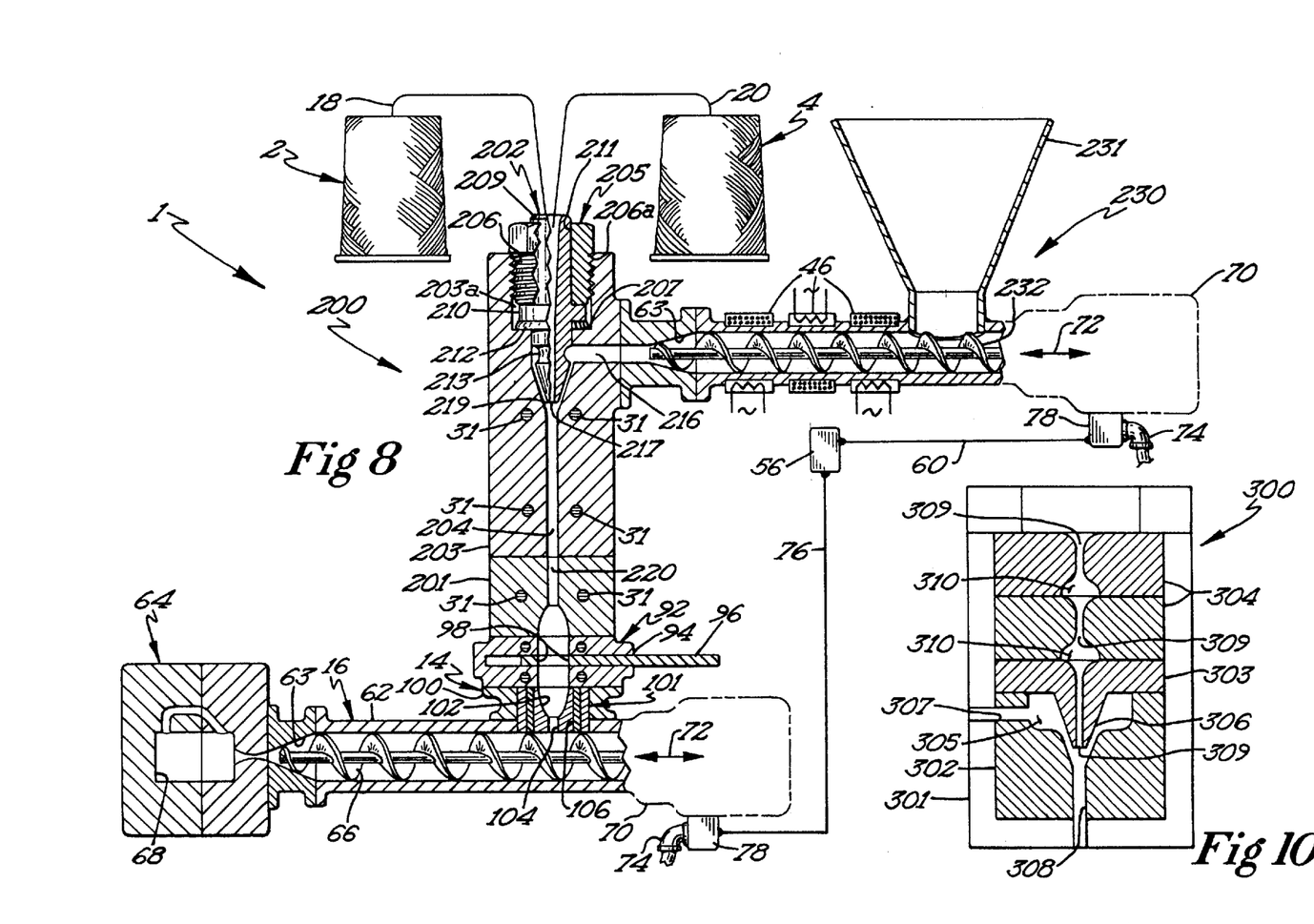
FIG. 8 is a vertical section of one embodiment of the apparatus of this invention not requiring a mechanical means to draw fiber strands through a coating die.
FIG. 10 is a schematic vertical section of a variation on the embodiment illustrated in FIG. 8 comprising an anti-backflow chamber; and, FIG. 11 is a schematic vertical section of a variation of the embodiment illustrated in FIG. 10.

A preferred embodiment of the present invention is illustrated in FIG. 8. The apparatus or system of this preferred embodiment comprises spools or rolls of fiber 2 and 4, a resin supply extruder 230 preferably of the type having feed screws that both reciprocate and rotate, a feed hopper 221 secured to the resin supply extruder 230, the coating die 200, an entrainment block 201, a transition nozzle assembly 14, and a receiving device generally indicated by reference numeral 16. Fiber strands 18,20 are coated with the hot molten resin supplied by the resin supply extruder 230 as the resin passes through the coating die 200. The coating die 200 comprises housing 203 having received in a recess 203a therein a guide nozzle 202. The recess 203a is fluidically connected to, and preferably arranged coaxially with, a passage 204 formed through the housing 203.

The guide nozzle 202 has a tip 208, a shank portion 209 and a collar 210 formed between the tip 208 and shank 209. As can be seen in FIG. 8, the recess 203a has interior threads 206 formed in an upper portion thereof which terminate at or above a shoulder 207. An elastomeric and heat resistant seal or washer 212 is received over the tip 208 of the guide nozzle 202 and is captured between collar 210 and shoulder 207 when the guide nozzle 202 is received in the recess 203a. A nut 205 having exterior threads 206a arranged to mate with interior threads 206 of the recess 203a in housing 203 and a bore 211 arranged to receive the shank 209 of the guide nozzle 202 therein is threaded into the recess 203a of the housing so as to bear against collar 210 of guide nozzle 202. The pressure exerted by the nut 205 upon the collar 210 causes collar 210 to compress the washer 212 between the collar 210 and shoulder 207, thereby sealing the recess 203a around the guide nozzle 202. In addition to sealing the recess 203a around the guide nozzle 202, the seal or washer 212 is useful to control the depth to which the tip 208 of the guide nozzle 202 extends into the recess 203a of the housing 203. As can be seen in the drawing, the shape of recess 203a around the tip 208 of nozzle 202 is complementary to the shape of the tip 208 of the nozzle 202. By advancing or backing-off nut 205, the tip 208 of nozzle 202 may be moved closer to, or farther from, the interior surface of the recess 203a, respectively.

The nozzle 202 has a passage 217 formed therethrough, preferably in a coaxial relationship with passage 204 in housing 203. Fiber strands 18, 20 are passed through passage 217 in the guide nozzle 202 and into the passage 204 such that at any given time, fiber strands 18, 20 are threaded entirely through the coating die 200. Resin for coating the fiber strands 18, 20 is introduced into the coating die 200 through an injection port 216 which comprises a bore formed through the housing 203 that is fluidically connected between the recess 203a and the resin supply extruder 230. The injection port 216 opens on the recess 203a in substantial alignment with a radial groove 213 formed around the tip 208 of the guide nozzle 202. As the recess 203a is sealed around the guide nozzle 202 by the elastomeric ring 212, the molten resin passes between the tip 208 of the guide nozzle 202 and the interior walls of the recess 203 and into passage 204 whereby. The then resin coated fiber exits the housing 203 of the coating die 200 through the passage 204.

In the embodiments described above in conjunction with FIGS. 1–7, the fiber strands 18, 20 were pulled through the coating die 200 by a conveying device 12. But, in the preferred embodiment illustrated in FIGS. 8–11, no such conveying device is required. Rather, the fiber strands 18, 20 are conveyed through the coating die 200 by means of viscous entrainment of the fiber strands 18, 20 with the molten resins flowing through the coating die 200. As indicated above, the fiber strands 18, 20 are disposed within the passage 204, the same passage through which the hot resin exits the housing 203. As the hot resin flowing through the passage 204 coats the fiber strands 18, 20, the resin imposes significant shear forces upon the fiber strands 18, 20 due to the high viscosity of the resin. These shear forces pull the fiber strands 18, 20 along with the flowing resin at substantially the same speed as the resin is flowing through the passage 204. The action of pulling fiber strands 18, 20 through the coating dies by the application of viscous shear forces is for the purposes of this application, referred to as the viscous entrainment of the fiber strands 18, 20.

The primary control parameter for obtaining a desired weight percent of fiber to resin is provided by the selection of the diameter of traction block passage 220 for a given fiber strand diameter. These diameters establish the ratio of the fiber strand cross-sectional area to the resin-flow annular area in the region where the fiber strands 18, 20 and resin are moving together through the traction block passage 220. Applying the specific gravities of the resin and the fiber materials to their respective cross-sectional areas will provide a first-order approximation of the resulting weight percentage.

Although ideally molten resin flows through the coating die 200 at the same linear velocity as the fiber strands 18, 20, this is rarely the case. Rather, it is more often the case that there is a disparity between the linear velocities of the fiber strands 18, 20 and the flowing resin. The difference in linear velocities is known as the "slip rate" and by controlling and maintaining the magnitude of the slip rate at a substantially constant value that is preferably at or close to zero, control of the ratio of fiber to resin in the molding material produced by the coating die 200 is repeatable and predictable. The slip rate is controlled by providing more traction between the resin and the fiber strands. One method of providing more traction is to lengthen the traction blocks 201, thereby increasing the length of passage 220 and the length of the fiber strands 18, 20 that are exposed to viscous shear stresses imparted thereto by the flowing resin. The total length of passage 204, together with the length of passage 220 in entrainment block 201 is called the traction length. The traction length of a coating die 200 determines the magnitude of viscous shear forces exerted upon the fiber strands being conveyed through the coating die 200 by the flowing resin. The traction length preferably ranges between 2 and 15 inches.

Another factor concerns the flow rate of the molten resin through the coating die 200. As the viscous shear stresses imposed on the fiber strands 18, 20 vary directly with regard to the velocity of the flowing resin, by forcing the resin to flow at higher speeds, the viscous shear stresses imparted to the fiber strands 18, 20 will be increased. The higher viscous shear forces imposed on the fiber strands 18, 20 cause the fiber strands to move at a linear velocity closer to that of the flowing resin and thereby decreases the magnitude of the slip rate. As the flow velocity of the resin is directly related to the pressures at which the resin is introduced into the coating die 200, raising the pressure at which the molten resins are introduced into the coating die 200 will increase the linear velocity of the resins flowing through the coating die.

Consequently, by controlling the traction length, the diameter ratios between the passages 204 and 220 and the fiber strands 18, 20, and the linear velocity of the flowing resin, the weight percent of fiber in the molding material produced by the compounding apparatus/coating die 200 may be predictably, accurately and precisely controlled by controlling the slip rate of the fiber strands 18, 20 with regard to the flowing resin. It is to be understood that other factors not listed above, such as the viscosity of the resins being introduced into the coating die 200 and the temperature and/or chemical make-up of the thermoplastic resins, among others, also have a bearing on the slip rate and are considered to be within the broad scope of this disclosure.

Because the viscous entrainment of the fiber strands 18, 20 requires that the resin and fiber strands pass through relatively narrow passages, the resin supply extruder(s) 230 must be capable of operating at high pressures to force the molten resin through the coating die 200. In addition to being able to supply resin at high pressures, a suitable resin supply extruder 230 must also be able to start and stop the flow of resin in a precise and accurate manner. Therefore, it is preferred to utilize a resin supply extruder 230 of the type having a reciprocating screw 232 as illustrated in FIG. 1 at 16. Such extruders are able to control both flow volume and pressure of the resin being supplied very precisely and accurately, thereby allowing the discontinuous production of the fiber reinforced molding material. But, in situations where discontinuous operation is not an object, as with a continuous extrusion process, a standard rotating auger type extruder (as illustrated in FIG. 1 at reference numeral 6) may be utilized as the resin supply extruder 230, provided, of course, that the rotating auger type extruder is capable of providing the resin to the coating die at the requisite pressures. A device such as a gear pump can be connected between a standard rotating auger type extruder and the coating die to increase the pressure of the molten resin being introduced into the coating die.

Preferably, one or more extruders 230 are arranged to supply hot molten resin to the coating die 200 at pressures ranging between 4,000 and 40,000 psi. By way of example, resin flowing through a coating die 200 at pressures between 12,000 and 14,000 viscously entrained the fiber strands 18, 20 and caused them to be drawn through the coating die 200 at speeds of between 80 and 250 feet per minute. The resulting fiber reinforced resin mixture comprised between 20 to 60 weight percent fiber strands.

In order to heat the resin to a suitable temperature, resin supply extruder 230 is provided with a plurality of electric heaters 46 as described above. In addition, it is preferred to provide a plurality of electric heaters 31 throughout the housing 203 of the coating die 200 to prevent the resins from solidifying within the housing 203.

The radial groove 213 in the tip 208 of the guide nozzle 202 helps to prevent twisting of the fiber strands 18, 20 and prevents stagnation of the resins flowing through the coating die 200. The space created by the radial groove 213 allows resin from the resin supply extruder 230 to enter passage 204 in an even manner, thereby preventing twisting of the fiber strands 18, 20 and also promoting even coating of the fiber strands. The pressurized molten resins entering the coating die 200 first fills the space created by the radial groove 213. Once the radial groove 213 has been filled by the resin, the resin is forced downward toward passage 204 between the tip 208 of the guide nozzle 202 and the internal walls of recess 20a. As indicated above, the space between the tip 208 of guide nozzle 202 and the interior walls of recess 203a may be adjusted by nut 205. In the embodiment of FIG. 8 the space between the tip 208 of nozzle 202 and the walls of recess 203a have a frustoconical shape. Resin passing into the passage 204 will contact and coat the fiber strands 18, 20 as they exit the opening 219 of the passage 217 formed through the guide nozzle 202 where the tip 208 is located adjacent the passage 204.

Figures 9, 11:
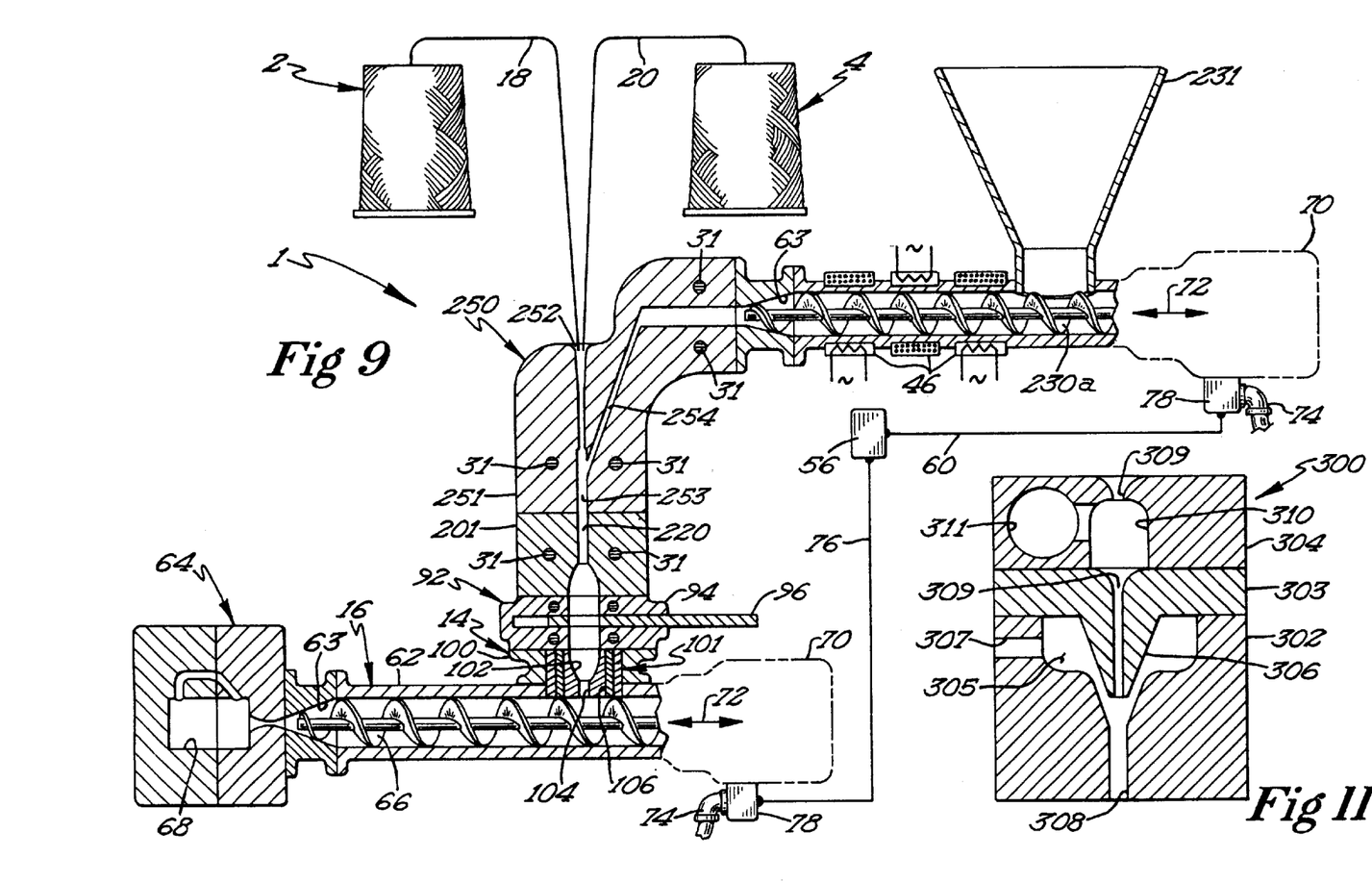

It is preferred that the diameter of passage 217 through guide nozzle 202 be the same size or smaller than the diameter of the passage 204 at least at the tip 208 of the nozzle 202. The combination of a smaller passage 217 and the fiber strands 18, 20 partially obscuring the passage 217, prevents the hot, molten resin from back flowing into the nozzle 202. In addition, the shear forces imposed by the moving fiber strands 18, 20 upon any resin which may have back flowed into the passage 217 of the guide nozzle 202 have a tendency to pull the resin back into the passage 204.

Where the resin has a relatively low viscosity and is used under relatively high pressure, the problem of resin back flowing through the passage 217 of the guide nozzle may become exacerbated. In this case the embodiment of FIG. 8 may be modified as illustrated in FIGS. 10 and 11. In FIG. 10 the coating die 300 is comprised of a series of plates 302–304 that are securely clamped together in a housing 301.

Plate 302 has a recess 305 formed therein which is arranged to receive a nozzle 306 that extends from plate 303. Recess 305 is constructed and arranged to form an annular space around the nozzle 306. A resin injection port 307 extends through the housing 301 and plate 302 to fluidically connect a resin supply extruder such as the extruder 230 illustrated in FIGS. 8 and 9 to the coating die 300. A passage 308 extends from the recess 305 in plate 302 through the housing 301. Plate 303, 304 also have a passage 309 formed therethrough that is preferably arranged coaxially with passage 308. Fiber strands 18, 20 pass through passage 309, out of nozzle 306, and into the passage 308 where they are coated with resin introduced into the coating die 300 through resin injection port 307. Plates 304 are substantially identical to one another and each plate 304 comprises an anti-back flow chamber 310 formed integral with passage 309 in each plate 304. If resin should be forced up through nozzle 306 into passage 309, anti-back flow chambers 310 provide a location for the resin to accumulate rather than allowing the resin to simply exit the coating die 300 through passage 309. Most often any resin which may accumulate in the anti-back flow chambers 310 will be drawn back into passage 308 by the fiber strands 18, 20 which is being pulled through the passage 309 into passage 308. In any case, anti back flow chambers 310 allow a coating die 300 to be operated for longer periods of time between cleanings as resin will typically not escape from a passage 309 incorporating one or more anti back flow chambers 310.

FIG. 11 illustrates an alternate embodiment of coating die 300 in which plate 304 is provided with an anti-back flow chamber 310 that is fluidically connected to a resin conveying device 311 that conveys resins back to a resin supply extruder or to a reclamation device which collects the resin which has flowed back into chamber 310 for later re-use. Resin conveying device 311 is preferably an auger type extruder.

The coating dies 300 illustrated in FIGS. 10 and 11, like the coating die 250 illustrated in FIG. 9, may also be provided with electric heaters (not shown) to maintain the resin in a molten state.

FIG. 9 is another preferred embodiment of the present invention which functions in the same manner as the embodiment illustrated in FIG. 8. The coating die 250 differs from that of FIG. 8 primarily in that the guide nozzle structure 202 of coating die 200 is eliminated in favor of a solid housing 251. The coating die 250 of FIG. 9 comprises a solid housing having a first passage 252 and a second passage 253 formed through the solid housing 251 in a preferably coaxial relationship. A resin injection port 254 is formed through the solid housing 251 and intersects the second passage 253 adjacent the intersection between the first and second passages 252, 253. Preferably the resin injection port 254 will intersect the second passage 253 at an acute angle to the axis of the first passage 253. The acute angle of intersection between the resin injection port 254 and the second passage 253 helps to direct the flow of resin into and through the second passage 253 and further helps to prevent the back flow of resin into the first passage 252. Fiber strands 18, 20 are threaded through the first and second passages 252, 253 of the coating die 250 and become coated by the resin with which they are viscously entrained.

A coating die 250 constructed with a solid housing 251 is preferably machined from a single piece of suitable material which as aluminum or steel. Alternatively the housing 251 of coating die 250 may be formed by casting or by laminating pre-machined parts together. In the case of casting and lamination, a housing so constructed will require at least some machining to clean up the inner surfaces of the first and second passages 252,253 to prevent breaks in the fiber strands 18, 20 and some machining of the resin injection port 254 to improve the flow characteristics. One advantage to using the casting or laminating process is that it may be possible to form anti-back flow chambers in the first passage 252 as illustrated in FIGS. 10 and 11. Electric heaters 31 may be affixed to the outer surface of the housing 251 or may be inserted into holes drilled into the housing itself.

It is anticipated that various changes and modifications may be made in the apparatus and process described herein, without departing from the spirit and scope of the invention as defined by the following claims. For example, it is anticipated that impellers or pumping devices other than those described herein with respect to conveying device 12 may be utilized to satisfactorily pull and push coated fiber strands through a coating die and into a receiving device. Also, in addition to the types of molding apparatus described above, the apparatus and process of this invention may be used with profile extruding equipment. In such an application, the hot resin and fiber mixture would be fed from nozzle 101 or 152 into the extruder feeding the extrusion die of a profile extruder as used to make, e.g., plastic pipe.

What is claimed is:

1. An apparatus for wetting and conveying fiber strands with a thermoplastic resin comprising:
   a housing having a passage with a fiber inlet and an outlet, said passage being arranged and constructed to permit a continuous strand of said fiber to be passed from said inlet through said housing and out of said outlet, said housing further comprising a resin injection port that is fluidically connected to said passage to direct said thermoplastic resin into said passage under pressure into contact with said continuous strand of fiber and wherein the pressurized flow of said thermoplastic resin into said passage causes said continuous strand of fiber to be drawn through said housing, said continuous strand of fiber also becoming substantially wetted by said resin.

2. The apparatus for coating fiber strands with a thermoplastic resin of claim 1 wherein said inlet of said housing comprises a nozzle that extends into said passage.

3. The apparatus for coating fiber strands with a thermoplastic resin of claim 1 wherein said housing further comprises a resin receiving chamber in fluidic communication with the resin injection port.

4. The apparatus for coating fiber strands with a thermoplastic resin of claim 1 wherein said passage has an axis of symmetry and said injection port has an axis of symmetry and said axes of symmetry of said passage and said injection port intersect.

5. The apparatus for coating fiber strands with a thermoplastic resin of claim 3 wherein said chamber has an axis of symmetry and said injection port has an axis of symmetry and said axes of symmetry of said chamber and said injection port intersect at an acute angle.

6. The apparatus for coating fiber strands with a thermoplastic resin of claim 3 wherein said chamber has an axis of symmetry and said injection port has an axis of symmetry and said axes of symmetry of said chamber and said injection port are perpendicular to one another.

7. The apparatus for coating fiber strands with a thermoplastic resin of claim 3 wherein said chamber has an annular shape and said injection port has an axis of symmetry, said axis of symmetry of said injection port intersecting said annular chamber tangentially.

8. An apparatus for coating and conveying fiber strands with a suitable liquid comprising:
   a housing having a fiber inlet and outlet;
   a fiber entrainment and coating passage within the housing connected between the fiber inlet and outlet for the passage of a continuous strand of fiber through the housing;
   a liquid injection port in said housing in fluid flow communication with the fiber entrainment passage to introduce pressurized liquid in a fluid state into contact with the continuous strand of fiber in the entrainment passage, whereby the pressurized flow of liquid into said entrainment passage conveys the continuous strand of fiber through the housing and out of the fiber outlet, and the continuous strand of fiber becomes coated with liquid.

9. The apparatus for coating and conveying fiber strands with a suitable liquid of claim 8 further comprising:
   a liquid receiving chamber in said housing connected to the liquid injection port; and
   at least one flow passage extending from the liquid receiving chamber to the fiber entrainment passage, whereby the liquid receiving chamber and the flow passage place the liquid injection port in fluidic communication with the fiber entrainment passage.

10. The apparatus for coating and conveying fiber strands with a suitable liquid of claim 9 wherein:
    said at least one flow passage extends in the general direction of extent of the fiber entrainment passage, thereby directing pressurized liquid in the same general direction as that of fiber movement within the fiber entrainment passage and enhancing movement of the fiber strand towards the fiber outlet.

11. The apparatus for coating and conveying fiber strands with a suitable liquid of claim 8 further comprising:
    a fiber inlet nozzle having an outlet orifice in fluid flow communication with the fiber entrainment passage, said nozzle being positioned within said fiber inlet in the housing, and said outlet orifice being of a predetermined size to allow a fiber strand of predetermined diameter to pass therethrough while substantially preventing the backflow of pressurized liquid from the fiber entrainment passage through the fiber inlet nozzle.

12. The apparatus for coating and conveying fiber strands with a suitable liquid of claim 11 wherein:
    said nozzle has a tapered outlet end constructed and arranged to define at least one flow passage in fluid flow communication between the liquid injection port and the fiber entrainment passage.

13. The apparatus for coating and conveying fiber strands with a suitable liquid of claim 12 wherein:

said at least one flow passage is defined between the tapered outlet of the nozzle and an adjacent wall of the housing.

14. The apparatus for coating and conveying fiber strands with a suitable liquid of claim 12 wherein:

the nozzle has a liquid receiving chamber formed therein from which said flow passage extends to the fiber entrainment passage, said chamber being in fluidic communication with the liquid injection port within the housing.

15. The apparatus for coating and conveying fiber strands with a suitable liquid of claim 14 wherein:

the liquid receiving chamber is of an annular shape.

16. The apparatus for coating and conveying fiber strands with a suitable liquid of claim 12 wherein:

said flow passage has a discharge end opening into the fiber entrainment passage in close proximity to the outlet orifice of the nozzle.

17. The apparatus for coating and conveying fiber strands with a suitable liquid of claim 8 further comprising:

a receiving device constructed and arranged to receive the liquid coated fiber from the outlet of the housing and to deliver said liquid coated fiber to a molding machine positioned in close proximity to the receiving device.

18. The apparatus for coating and conveying fiber strands with a suitable liquid of claim 8 further comprising:

a supply of continuous fiber strand connected to the fiber inlet of the housing; and, a supply source of molten thermoplastic liquid in fluidic communication with the liquid injection port in the housing.

19. The apparatus for coating fiber strands with a suitable liquid to form a molding material of claim 11 wherein said outlet orifice of said nozzle has a diameter smaller than the diameter of said fiber entrainment passage.

20. The apparatus of claim 8 wherein said passage further comprises:

a back flow chamber located upstream from where said injection port communicates with said passage.

21. The apparatus for coating fiber strands with a suitable liquid to form a molding material of claim 20 wherein said passage further comprises:

a plurality of back flow chambers located above where said injection port communicates with said passage.

22. An apparatus for wetting fiber strands with a thermoplastic resin to form a molding material comprising:

a body having a passage formed therethrough, said passage having a continuous strand of said fiber passed therethrough, said body further having an injection port formed therein, said injection port being in fluidic communication with said passage;

a resin supply device arranged and constructed to introduce a supply of resin into said injection port, said resin flowing through said injection port to said passage in said body, said resin exiting said body through said passage, said resin flowing through said passage entraining said continuous strand of fiber therewith, said continuous strand of fiber subsequently becoming wetted by said resin to form said molding material.

23. An apparatus for coating fiber strands with a thermoplastic resin to form a molding material comprising:

a body having a passage formed therethrough, said passage having a first and a second diameter, said passage having a continuous strand of said fiber passed therethrough, said body further having an injection port formed therein, said injection port further being in fluidic communication with said passage between said first and said second diameters, said first and second diameters of said passage being constructed and arranged such that when a thermoplastic resin is caused to flow through said injection port to said passage, said resin flows in a predetermined direction and causes said continuous strand of fiber to become entrained in said flow of said thermoplastic resin, said continuous strand of fiber being wetted in a predetermined ratio of fiber to thermoplastic resin.

24. The apparatus for coating fiber strands with a thermoplastic resin to form a molding material of claim 23 wherein said conveying device may be operated in a discontinuous manner to produced a desired quantity of said molding material.

25. The apparatus for coating fiber strands with a thermoplastic resin to form a molding material of claim 23 wherein said passage further comprises: an annular injection chamber, said injection port being fluidically connected to said injection chamber.

26. The apparatus for coating fiber strands with a thermoplastic resin of claim 25 wherein said chamber has an axis of symmetry and said injection port has an axis of symmetry and said axes of symmetry of said chamber and said injection port intersect.

27. The apparatus for coating fiber strands with a thermoplastic resin of claim 25 wherein said chamber has an axis of symmetry and said injection port has an axis of symmetry and said axes of symmetry of said chamber and said injection port intersect at an acute angle.

28. The apparatus for coating fiber strands with a thermoplastic resin of claim 25 wherein said chamber has an axis of symmetry and said injection port has an axis of symmetry and said axes of symmetry of said chamber and said injection port are perpendicular to one another.

29. The apparatus for coating fiber strands with a thermoplastic resin of claim 25 wherein said injection port has an axis of symmetry, said axis of symmetry of said injection port intersecting said annular chamber tangentially.

30. The apparatus for coating fiber strands with a thermoplastic resin to form a molding material of claim 25 wherein said body further comprises:

a nozzle which extends into said injection chamber, said passage extending through said nozzle to open into said injection chamber.

31. The apparatus for coating fiber strands with a thermoplastic resin to form a molding material of claim 30 wherein said passage of said nozzle has a diameter smaller than the diameter of said passage where said passage exits said injection chamber.

32. The apparatus for coating fiber strands with a thermoplastic resin to form a molding material of claim 25 wherein said passage further comprises:

a back flow chamber located upstream from where said injection port communicates with said injection chamber.

33. The apparatus for coating fiber strands with a thermoplastic resin to form a molding material of claim 23 wherein said passage further comprises:

a back flow chamber located upstream from where said injection port communicates with said passage.

34. The apparatus for coating fiber strands with a thermoplastic resin to form a molding material of claim 33 wherein said passage further comprises:

a plurality of back flow chambers located above where said injection port communicates with said passage.

35. An apparatus for wetting and conveying fiber strands with a thermoplastic resin comprising:

a housing having a passage with a fiber inlet and an outlet, said passage being arranged and constructed to permit a continuous strand of said fiber to be passed from said inlet through said housing and out of said outlet, said housing further comprising a resin injection port that is fluidically connected to said passage to direct said thermoplastic resin into said passage under pressure into contact with said continuous strand of fiber and wherein the pressurized flow of said thermoplastic resin into said passage causes said continuous strand of fiber to be drawn through said housing, said continuous strand of fiber also becoming substantially wetted by said resin, said inlet of said housing having formed therein at least one back flow passage.

36. An apparatus for wetting and conveying fiber strands with a thermoplastic resin comprising:

a housing having a passage with a fiber inlet and an outlet, said passage being arranged and constructed to permit a continuous strand of said fiber to be passed from said inlet through said housing and out of said outlet, said housing further comprising a resin injection port that is fluidically connected to said passage to direct said thermoplastic resin into said passage under pressure into contact with said continuous strand of fiber and wherein the pressurized flow of said thermoplastic resin into said passage causes said continuous strand of fiber to be drawn through said housing, said continuous strand of fiber also becoming substantially wetted by said resin; and, a traction block having a bore formed therethrough, said bore being fluidically connected to said outlet of said passage of said housing so as to pass said continuous strand of fiber and said thermoplastic resin therethrough, said bore of said traction block having a diameter sized to pass therethrough said continuous strand of fiber and said thermoplastic resin in a predetermined weight ratio.

* * * * *